United States Patent Office 3,357,107
Patented Dec. 12, 1967

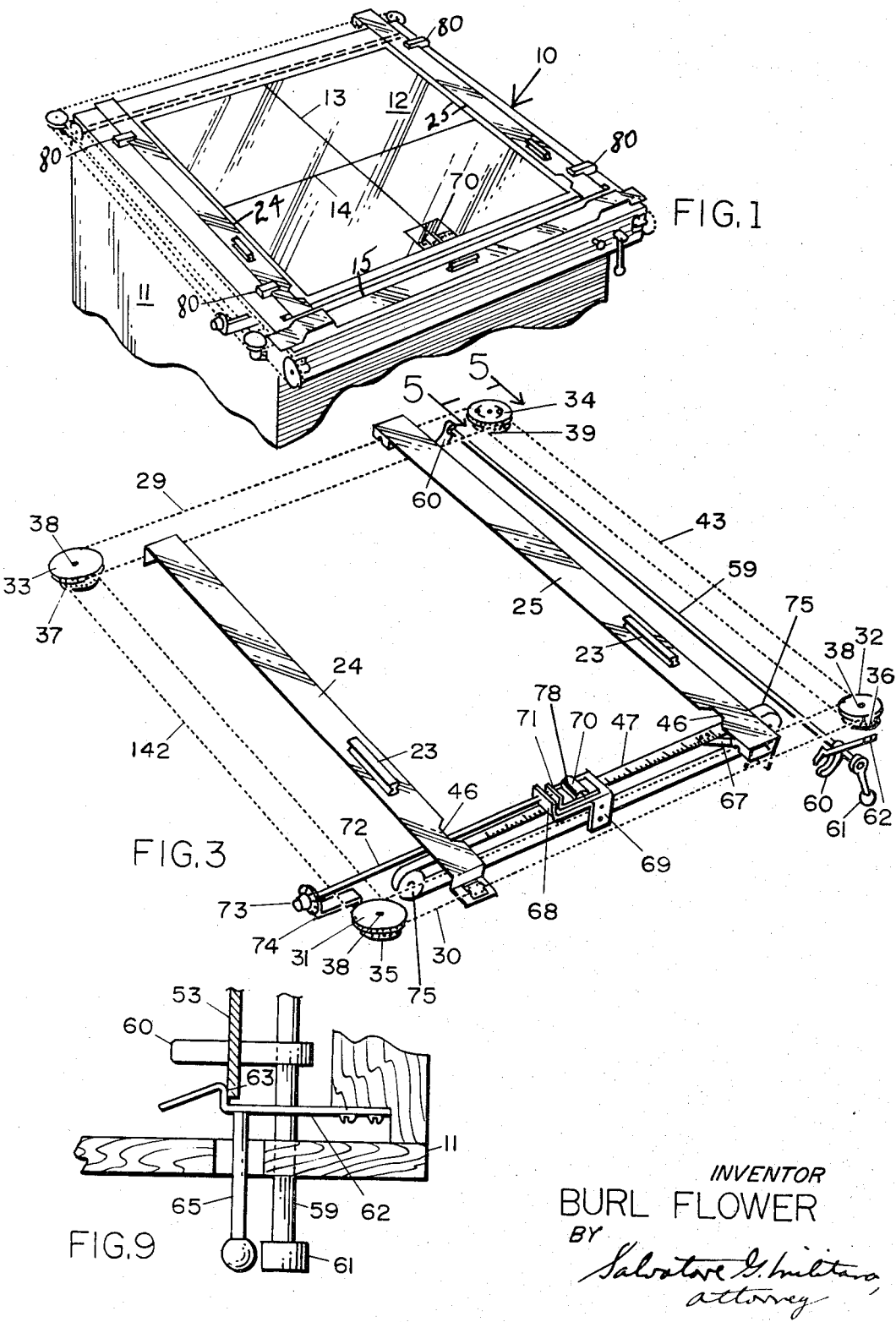

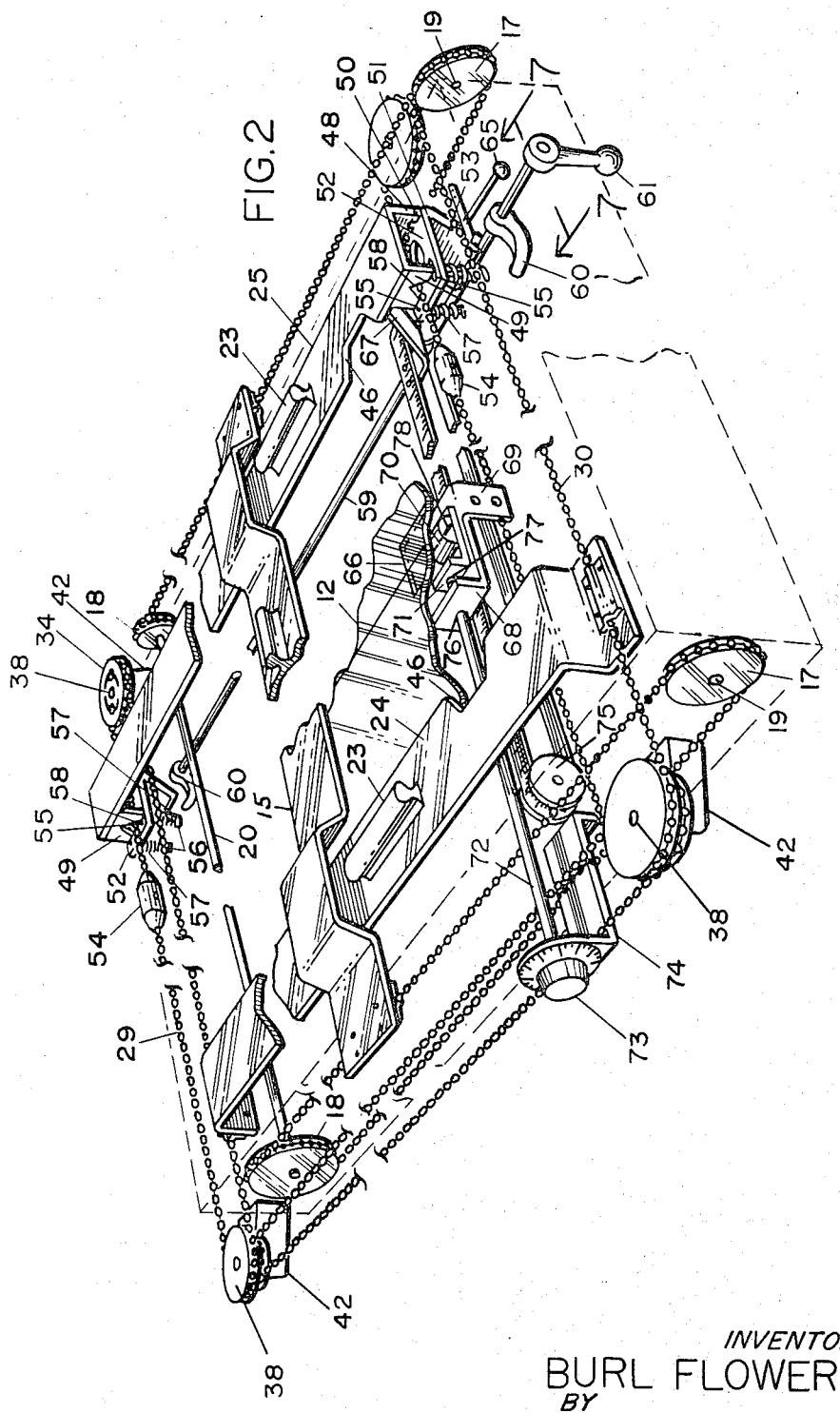

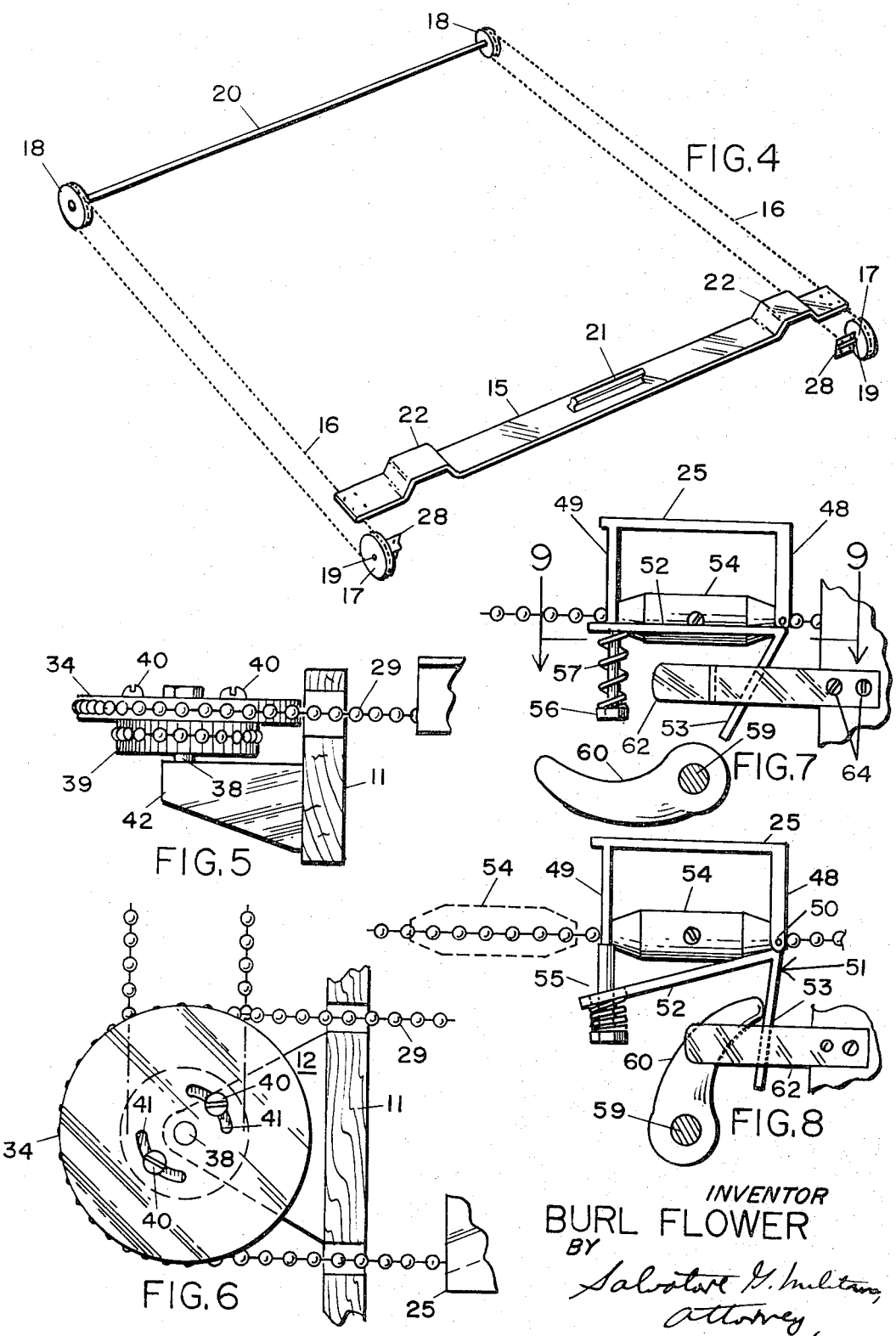

3,357,107
THREE-WAY LAYOUT CENTERING TABLE WITH DIMENSIONAL CORRECTION
Burl Flower, 8852 SW. 17th Terrace,
Miami, Fla. 33165
Filed Oct. 22, 1965, Ser. No. 501,819
5 Claims. (Cl. 33—184.5)

ABSTRACT OF THE DISCLOSURE

A layout centering apparatus having a rectangular table with centerlines marked thereon and with a horizontal straight edge and a pair of vertical straight edges attached at their ends to a series of interconnected pulleys and endless belts whereby upon movement of the horizontal straight edge and vertical straight edges, they are maintained at right angles to each other at all times and movement of one of the vertical straight edges effects a movement of the other vertical straight edge an equal distance in a direction toward or away from the first vertical straight edge, a scale secured to one of the vertical straight edges and extending past the vertical centerline of the table with an adjusting means for moving the scale to correct for the thickness of a marking device used in connection with the apparatus.

---

This invention relates to layout tables for lithography and is more particularly directed to a three way layout centering table with dimensional correction.

A principal object of the present invention is to provide a layout table having a horizontally disposed rule that is vertically slidable on the table and a pair of vertical rules that slide horizontally simultaneously equal distances from a vertical center line with means for locking one of the vertical rules and permitting the other to move alone.

Another object of the present invention is to provide a layout table with a pair of vertical rules having a pulley system which compels the rules to move simultaneously in a horizontal direction and in equal distances from a centerline and a scale secured to one of the vertical rules with means for adjustably moving a hairline relative to the scale in correcting for the thickness of the marking device.

A further object of the present invention is to provide a layout table with three rules mounted on pulley system in lieu of T-squares, triangles and the like for aligning negatives in lithography, drawing lines or making cutouts.

A still further object of the present invention is to provide a layout table that provides a rule that is exactly horizontal in all its positions, a pair of further rules that are exactly vertical in all their positions, the vertical rules being movable singly or simultaneously upon the movement of one and whose dimensions are readily corrected for the thickness of the marking device so that the distance to the centerline is exact at all times.

A still further object of the present invention is to provide a layout table which is simple in construction and operation, most effective in its use and accurate in the results attained.

With these and other objects in view, the invention will be best understood from a consideration of the following detailed description taken in connection with accompanying drawings forming a part of this specification, with the understanding, however, that the invention is not confined to any strict conformity with the showing of the drawings but may be changed or modified so long as such changes or modifications mark no material departure from the salient features of the invention as expressed in the appended claims.

In the drawings:

FIGURE 1 is a perspective view of a three-way layout centering with dimension correcting constructed in accordance with my invention showing the base or support structure in part.

FIGURE 2 is a fragmentary perspective view of my table with parts broken away to show more clearly the pulley and dimension compensating systems.

FIGURE 3 is a schematic view showing only the pulley system for the vertical rules and the dimension compensating apparatus.

FIGURE 4 is a similar view showing the pulley system for the horizontal rule.

FIGURE 5 is a fragmentary elevational view of the compensation sprocket as viewed along the line 5—5 of FIGURE 3.

FIGURE 6 is a top plan view thereof.

FIGURE 7 is a cross sectional view taken along the line 7—7 of FIGURE 2 showing the vertical rule releasing mechanism.

FIGURE 8 is a similar view showing the mechanism actuated to release the vertical rule.

FIGURE 9 is a cross sectional view taken along the line 9—9 of FIGURE 7.

Referring to the drawings wherein like numerals are used to designate similar parts throughout the several views, the numeral 10 refers to my three-way layout centering table with dimensional correction mounted on a cabinet 11 and consisting of a translucent plate member 12 on which are scribed a vertical centerline 13 and a horizontal centerline 14. Mounted beneath the translucent plate member or glass top 12 is a source of light (not shown) for the purpose of permitting a user of this apparatus to view the material that he is laying out clearly and with extreme accuracy as permitted by my device 10 and required by the type of layout work being accomplished.

Mounted for movement along the vertical centerline 13 is a horizontal rule 15 whose end portions are fastened to endless bead chains 16 which are wound about pulleys 17 at the front end of the device 10 and sprocket type pulley 18 at the other end. The pulleys 17 are rotatably mounted to the cabinet 11 by pins 19 mounted on members 28 that are secured to the cabinet 11 for individual rotation while the sprocket pulleys 18 rotate in unison being both secured to a shaft 20 that extends between the sprocket pulleys 18. The horizontal rule 15 is provided with a centrally disposed grip or handle 21 and elevated portions 22 symmetrically disposed on either side of the handle 21 to permit handles 23 of the vertical rules 24 and 25 to pass therebelow.

Once the horizontal rule 15 has been properly and securely fastened to the bead chains 16 in a horizontal position, the horizontal rule 15 will remain in the horizontal position at any position on the table 12. When the horizontal rule 15 is moved along the vertical centerline 13, the bead chains 16 will move simultaneously turning the sprocket pulleys 18 and shaft 20. The accuracy of the horizontal rule 15 may be checked readily by moving the rule 15 to the position of the horizontal centerline 14 and superimposing the straight edge of the rule 15 on the centerline 14.

The pair of vertical rules 24 which is placed on either side of the vertical centerline 13 and maintained equidistant from the vertical centerline 13 as is explained in detail hereinafter is secured at their ends to endless bead chains 29 and 30. Chain 30 is wound about sprocket pulleys 31 and 32 at their ends while chain 29 is wound about sprocket pulleys 33 and 34 at their ends. All of the sprocket pulleys 31, 32, 33 and 34 are of identical size and construction except that sprocket pulleys 31, 32 and 33 are riveted or otherwise secured to further sprocket pulleys 35, 36 and 37 respectively. These combined pulleys are rotatably mounted on brackets 42 by means of pins 38, the brackets 42 being secured to the sides of the cabinet 11. On the other hand, the pulley 34 is adjustably fastened to a further sprocket pulley 39 by means of bolts 40 which extend through elongated slots 41 formed on sprocket pulley 34 and threaded into the sprocket pulley 39, thus permitting the sprocket pulley 34 to be rotatably adjusted with relation to the sprocket pulley 39. See FIGURES 5 and 6. Sprocket pulleys 35 and 37 are engaged by the loops formed by the endless bead chain 142 while the sprocket pulleys 36 and 39 engage the loops formed by the endless bead chain 43.

Before fastening the ends of the vertical rules 24 and 25 to the bead chains 29 and 30, the rules 24 and 25 are brought to the center of the glass top 12 with the inner edges of the rules 24 and 25 engaging each other and superimposed over the vertical centerline 13. According to this construction when either of the vertical rules 24 or 25 or both is moved away from the vertical centerline 13, the other vertical rule will move the same distance away from the vertical centerline 13 inasmuch as all of the sprocket pulleys 31, 32, 33, 34, 35, 36, 37 and 39 will rotate in unison as the endless chain beads 29, 30, 142, and 43 will move simultaneously. If for any reason such as changes in temperature or if one of the vertical rules become unfastened from the bead chains so that the vertical rules 24 and 25 are not equidistant from the centerline 13, the bolts 40 of the pulley 34 are loosened to release the sprocket pulley 34 from the sprocket pulley 39. Then the vertical rules 24 and 25 are placed accurately with relation to the vertical centerline 13 which movement will cause the sprocket pulleys 34 and 39 to rotate slightly with relation to each other. Now the bolts 40 are replaced in the slots 41 and threaded tightly to fasten the sprocket pulleys 34 and 39 together. Once adjusted movement of one of the vertical rules 24 and 25 will move the other an equal distance from the centerline 13. Both of the vertical rules 24 and 25 are notched as at 46 to permit viewing a scale 47 when the rules 24 and 25 are in abutting relation at the position of the vertical centerline 13.

The vertical rule 25 is releasably secured at its ends to the bead chains 29, 30 in order to permit use of the single vertical rule 24 when desired. As best shown by FIGURES 2, 7, 8 and 9, this structure consists of depending members 48 and 49 mounted along the edges of the rule 25 adjacent each end thereof. The depending members 48 form a hinge pin support for a pivot pin 50 pivotally secured to a V-shaped member 51 having leg portions 52 and 53. The depending member 49 operates as a gate for securing and releasing a stop member 54 secured to each of the bead chains 29 and 30. When the vertical rule 25 is operating in conjunction with the vertical rule 24 so that movement of one rule will effect an equal movement of the other, the stop members 54 will be positioned between the depending membrs 48 and 49 and the leg portion 52 of the control member 51 will be in yielding engagement with the gate 49. The leg portion 52 is provided with bores 55 through which spring supporting bolts 56 extend which are fastened to the gate 49. Coil springs 57 mounted about the bolts 56 bear against the lower surface of the leg portion 52. A notch 58 formed on the lower edge of each of the gates 49 permit the stop members 54 to slide past the gates 49 in releasing the vertical rule 25 from the bead chains 29 and 30 when the leg portions 52 are swung downwardly away from the gate 49 against the spring pressure 57 as shown by FIGURE 8.

Means for releasing the stop members 54 from between the depending members 48 and 49 consist of a shaft 59 mounted in proximity of the leg portions 53 of the control members 51 and extending along the full length of the cabinet 11. Below each of the control members 51 is an arcuate finger 60 secured to the shaft 59. When a handle 61 which is secured to the free end of the shaft 59 is rotated, the fingers 60 engage the free edge of the leg portions 53 of the control members 51 to cause the latter to pivot about the hinge pins 50 causing the leg portions 52 to swing downwardly against the coil springs 57. The two rules 24 and 25 are now disengaged from each other. When the vertical rule 24 is moved toward the centerline 13, the chain beads 29 and 30 will move simultaneously therewith. However, vertical rule 25 will not move since the stop members 54 on the bead chains 29 and 30 will slide past the notch 58 of the gate 49. To prevent the control member 51 from returning to its original position by virtue of the force of coil springs 57, the leg portions 53 are engaged by a leaf spring 62 secured as at 64 to the cabinet 11 and having a shoulder 63 which engages the leg portion 53 when the control member 51 has pivoted to release bead chains 29 and 30 from the rule 25. The rule 25 is now locked against movement. A handle 65 secured to the catch member 62 is pulled outwardly to release the shoulder 63 from the leg portion 53 permitting the control member 51 to swing back to its stop engaging position. The handle 65 is actuated to release the catch 62 when the vertical rule 24 has been returned to its extreme left position and the stop members 54 will be positioned in contact engagement with the hinge support 48. Then when the handle 65 is pulled outwardly, the leg portion 52 will swing upwardly to trap the stop members 54 between the gates 49 and the hinge members 48. Now any movement of either of the vertical rules 24 or 25 will effect a like movement of the other vertical rule.

Beneath the opening formed by the notches 46 of the vertical rules 24 and 25 when the latter are together at the position of vertical centerline 13, is a transparent window 66 to permit viewing the scale 47. The scale 47 is formed into an endless belt looped about pulleys 75 mounted for rotational movement at the edges of the cabinet 11. The scale 47 is fastened to the vertical rule 25 by a bracket 67 so that movement of the rule 25 will effect movement of the scale 47. The scale 47 is so marked that when the vertical rules 24 and 25 are in abutting relation and superimposed over the vertical centerline 13, the scale will read zero. As the vertical rules 24 and 25 are moved away from each other, the distance between the vertical rules 24 and 25 will be indicated on the scale 47.

To adjust or correct for the size of the marking device such as ball point pen, etc. there is provided a knob 73 on which there are graduations or markings in fractions of an inch mounted on a bracket 74 that is secured to the side of the cabinet 11. The knob 73 is secured to a shaft 72 that extends through a bore 76 in a bracket 68 whereby the bracket 68 supports the free end of the shaft 72. The bracket is fastened to the cabinet 11 by a flanged portion 69. The free end of the shaft 72 is threadedly received by a threaded bore 77 in an L-shaped carriage 71. The carriage 71 which is slidably mounted on the bracket 68 supports a semi-cylindrical magnifying glass 70 on which there is a hairline 78. Normally when the hairline 78 is super-imposed over the zero marking on the scale 47, the two vertical rules 24 and 25 will be in abutting relation and the graduated dial on the knob 73 will register zero correction. To correct for the thickness of a marking device such as a ball point pen, the ball point pen being used is inserted between the vertical rules 24 and 25 causing the latter to separate or move away from each other a slight distance. The hairline 78 will now indicate the thickness of the ball point pen. Now by turning the dial 73, the shaft 72 will rotate in the bore 76 of the bracket 68 and simultaneously thread itself outwardly in the threaded bore 77 of the carriage 71 to slide the carriage 71 on the bracket 68 and return the hairline 78 over the zero on the scale 47. The device 10 has now been compensated or dimensionally corrected to correct for the thickness of the marking device.

In the normal use of my three way layout centering table, the sheet upon which the layout is to be made is placed on the glass top 12 with the center of the sheet placed approximately on the vertical centerline 13. Then by aligning the horizontal rule 15 with either the bottom or top edge of the sheet, the sheet will be properly positioned and the sheet is then fastened by Scotch tape to the glass top 12. The vertical rules 24 and 25 are brought together to the centerline with a marking device positioned between the vertical rules 24 and 25. A vertical line is now drawn on the sheet. This line should be in exact alignment and above the vertical centerline 13. The vertical rules 24 and 25 are brought toward each other again with the marking device therebetween. The knob 73 is now adjusted to return the hairline 78 back to zero thereby dimensionally correcting the scale 47 for the thickness of the ball point pen if that is being used as the marking device. Now when either of the vertical rules 24 or 25 is moved outwardly a certain distance, the other vertical rule will move in the opposite direction the same distance. Although the distance shown by the scale 47 will be the amount desired, the actual distance the rules 24 and 25 will be apart a distance equal to that indicated by the scale 47 plus the thickness of a ball point pen. When the ball point pen is placed against both the edges of the vertical rules 24 and 25 and vertical lines made on the layout sheet, the vertical lines will be exactly the desired distance apart and the layouts will be exactly dimensioned on either side of the centerline.

When it is desired to use the horizontal rule 15, the vertical rules 24 and 25 are slid to their extreme outward position, that is, their maximum distance apart where they will abut against stops 80 mounted on both sides of the device 10. The vertical rules 24 and 25 will now find themselves beneath the bridged portions 22 of the horizontal rule 15 thereby permitting the horizontal rule 15 to move vertically over the glass top 12.

If it is desired to use only one of the vertical rules, the vertical rules 24 and 25 are brought to their extreme outward position. The handle 61 is then rotated clockwise as seen in FIGURE 2. The cams or fingers 60 will engage the legs 53 of the V-shaped control members 51 causing the latter to pivot on their hinge pins 50 and swing the legs 52 downwardly against the spring pressure 57 until the shoulders 63 of the detents 62 engage the legs 53. The swinging movement of the legs 52 release the stop members 54 so that when the vertical rule 24 is moved, the bead chains 29 and 40 will move carrying with them the stop members 54 and leaving the vertical rule 25 immobile in its locked position. The vertical rule 24 may now be moved freely alone while the vertical rule 25 is stationary.

When it is decided to engage the vertical rule 25, the vertical rule 24 is first returned to its extreme outward position against the stops 80. This returns the stop members 54 to their position between the gate 49 and hinge support 48 of the vertical rule 25. Upon pulling outwardly on the handle 65, the shoulder 63 is disengaged from the leg 53 permitting the control member 51 to pivot about the hinge pin 50 against the spring pressure 57. The leg 52 will swing upwardly to engage the lower edge of the gate 49 and contain the stop member 54 between the members 48 and 49. Now the vertical rule 25 will move simultaneously with the vertical rule 24.

What I claim as new and desire to secure by Letters Patent of the United States is:

1. A layout centering apparatus comprising a substantially rectangular wall having centerlines marked thereon, a plurality of elongated rules slidably mounted on said wall, means maintaining one of said elongated rules substantially parallel to one of said centerlines, further means maintaining a pair of said elongated rules parallel to the other of said centerlines and simultaneously sliding both of said pair of elongated rules an equal distance in a direction toward or away from each other upon the movement of one of said pair of elongated rules and means operatively connected to said further means releasing one of said pair of said elongated rules from the other for the sole sliding movement of the other of said pair of elongated rules, a scale secured at one end to either of said pair of elongated rules and extending beyond the center of said rectangular wall and adjustable means cooperatively engaging said scale for correcting said scale for the thickness of a marking device being used in connection with said apparatus.

2. A layout centering apparatus comprising a substantially rectangular wall, a plurality of pulleys mounted about said wall, endless belt means forming loops engaging said pulleys, a pair of elongated rules positioned on said wall in substantially parallel relation, means securing said rules to said endless belt means whereby movement of one of said rules a certain distance compels a simultaneous movement in a direction toward or away from each other of a substantially equal distance of the other rule, means mounted on said other of said rules releasing said last named rule from said endless belt means whereby upon movement of said one of said rules, said other of said rules will remain stationary, a scale secured at one end to either of said pair of elongated rules and extending beyond the center of said rectangular wall and adjustable means cooperatively engaging said scale for correcting said scale for the thickness of a marking device being used in connection with said apparatus.

3. A layout centering apparatus comprising a substantially rectangular wall having a vertically disposed centerline, a pair of elongated rules slidably positioned on said wall substantially parallel with said vertical centerline, endless belt means forming loops at each end mounted along each side of said wall, one of said loops of each of said endless belt means being positioned in close proximity to a loop of an adjacent endless belt means at the corners of said rectangular wall, a pulley rotatably mounted at each end of said endless belt means and engaged by said loops of said endless belt means, means securing together said pulleys at said corners for unitary rotation of said pulleys and further means releasably securing one of said pair of pulleys for adjusting said rules and maintaining said rules in substantial parallel relation, means securing said pair of elongated rules to the horizontally disposed endless belt means for simultaneous movement in a direction toward or away from each other, a scale secured at one end to either of said pair of elongated rules and extending beyond the center of said rectangular wall and adjustable means cooperatively engaging said scale for correcting said scale for the thickness of a marking device being used in connection with said apparatus.

4. A layout centering apparatus comprising a substantially rectangular wall having a vertically disposed centerline, a pair of elongated rules slidably positioned on said wall substantially parallel with said vertical centerline, endless belt means forming loops at each end mounted along each side of said wall, one of said loops of each of said endless belt means being positioned in close proximity to a loop of an adjacent endless belt means at the corners of said rectangular wall, means securing said pair of elongated rules to the horizontally disposed endless belt means for simultaneous movement in a direction toward or away from each other of said rules, a pulley rotatably mounted at each end of said endless belt means and engaged by said loops of said endless belt means, means securing together said pulleys at said corners for unitary rotation of said pulleys, further means releasably securing one of said pair of pulleys for adjusting said rules and maintaining said rules in substantial parallel relation and releasable means cooperatively connected to one of said rules releasing said one of said rules from said endless belt means whereby the other of said rules may be moved without movement of said one of said rules, a scale secured at one end to either of said pair of elongated rules and extending beyond the center of said rectangular wall and adjustable means cooperatively engaging said scale for correcting said scale for the thickness of a marking device being used in connection with said apparatus.

5. A layout centering apparatus comprising a substantially rectangular wall having a vertically and a horizontally disposed centerline, a pair of elongated rules slidably positioned on said wall substantially parallel with said vertical centerline, endless belt means forming loops at each end mounted along each side of said wall, one of said loops of each of said endless belt means being positioned in close proximity to a loop of an adjacent endless belt means at the corners of said rectangular wall, means securing said pair of elongated rules to the horizontally disposed endless belt means for simultaneous movement in a direction toward or away from each other of said rules, a pulley rotatably mounted at each end of said endless belt means and engaged by said loops of said endless belt means, means securing together said pulleys at said corners for unitary rotation of said pulleys, further means releasably securing one of said pair of pulleys for adjusting said rules and maintaining said rules in substantial parallel relation releasable means cooperatively connected to one of said rules releasing said one of said rules from said endless belt means whereby the other of said rules may be moved without movement of said one of said rules, a horizontally disposed rule slidably positioned on said wall substantially parallel with said horizontal centerline, further endless belt means forming loops at each end mounted along vertical sides of said wall, means securing said further endless belt means to the ends of said horizontally disposed rules, a pulley rotatably mounted at each end of said further endless belt means and engaged by said loops, and a shaft secured to a pair of said last named pulleys for simultaneous rotatable movement of said shaft, said pulleys and said further endless belt means whereby said horizontally disposed rule is maintained parallel with said horizontal centerline at all positions of said rule, a scale secured at one end to either of said pair of elongated rules and extending beyond the center of said rectangular wall and adjustable means cooperatively engaging said scale for correcting said scale for the thickness of a marking device being used in connection with said apparatus.

References Cited
UNITED STATES PATENTS

| | | | |
|---|---|---|---|
| 1,431,293 | 10/1922 | Dittrich | 33—184.5 |
| 2,146,599 | 2/1939 | Smith | 33—174 |
| 2,901,832 | 9/1959 | Hulen | 33—184.5 |
| 3,000,104 | 9/1961 | Polayes | 33—184.5 |

SAMUEL S. MATTHEWS, *Primary Examiner.*